(12) United States Patent
Yasunaga (10) Patent No.: US 7,671,512 B2
(45) Date of Patent: Mar. 2, 2010

(54) IMPACT DRIVE ACTUATOR

(75) Inventor: Shinji Yasunaga, Asaka (JP)

(73) Assignee: Olympus Corporation, Tokyo (JP)

( * ) Notice: Subject to any disclaimer, the term of this patent is extended or adjusted under 35 U.S.C. 154(b) by 575 days.

(21) Appl. No.: 11/439,153

(22) Filed: May 23, 2006

(65) Prior Publication Data

US 2006/0261682 A1   Nov. 23, 2006

(30) Foreign Application Priority Data

May 23, 2005   (JP) .............................. 2005-149416

(51) Int. Cl.
*H02N 2/04* (2006.01)
*H02N 1/08* (2006.01)

(52) U.S. Cl. .................. 310/323.02; 310/309; 310/328

(58) Field of Classification Search ................. 310/309, 310/323.02, 328

See application file for complete search history.

(56) References Cited

U.S. PATENT DOCUMENTS

| | | |
|---|---|---|
| 5,225,941 A | 7/1993 | Saito et al. |
| 5,589,723 A | 12/1996 | Yoshida et al. |
| 6,841,899 B2 * | 1/2005 | Kaneko .......................... 310/12 |
| 2002/0050764 A1 * | 5/2002 | Koga et al. ................... 310/309 |

* cited by examiner

*Primary Examiner*—Walter Benson
*Assistant Examiner*—Derek J Rosenau
(74) *Attorney, Agent, or Firm*—Scully, Scott, Murphy & Presser, P.C (57) ABSTRACT

An impact drive actuator comprises a vibrating base plate configured to be slightly displaced in a reciprocating manner by a vibrator in first and second directions, a first slider disposed on the vibrating base plate, a first electrode formed on the vibrating base plate, a second electrode so formed on the first slider as to face the first electrode through an insulation film, and a potential difference generator configured to generate a potential difference between the first and second electrodes to allow a first electrostatic attractive force to act between the vibrating base plate and first slider. When the vibrator reciprocates the vibrating base plate, the time needed to displace the vibrating base plate in the first direction is different from that in the second direction. The first slider is displaced relative to the vibrating base plate in the direction where the time needed for displacement is larger.

1 Claim, 7 Drawing Sheets

FIG. 1A

Displacement direction of vibrating base plate

IMPACT DRIVE ACTUATOR

CROSS-REFERENCE TO RELATED APPLICATIONS

This application is based upon and claims the benefit of priority from prior Japanese Patent Application No. 2005-149416, filed May 23, 2005, the entire contents of which are incorporated herein by reference.

BACKGROUND OF THE INVENTION

1. Field of the Invention

The present invention relates to a compact impact drive actuator which stepwise drives a slider.

2. Description of the Related Art

There is known an actuator that supplies a sawtooth wave drive pulse to an electromechanical conversion device coupled to a drive shaft to displace the drive shaft along its shaft to thereby move a movable member friction-coupled to the drive shaft along its shaft. Such an actuator is called an impact drive actuator.

The operating principle of the impact drive actuator will be described. The impact drive actuator has a piezoelectric vibrator whose one end is fixed to a stationary member and the other end is attached to a drive shaft. A movable body is friction-coupled to the drive shaft so as to be movable in the vibration direction of the piezoelectric vibrator. In such a configuration, a sawtooth wave drive pulse is applied to the piezoelectric vibrator.

More specifically, firstly, a gradually increased voltage is applied to the piezoelectric vibrator. The piezoelectric vibrator is then displaced and, at the same time, the drive shaft is displaced. The gradual displacement of the piezoelectric vibrator allows the movable body to be moved together with the drive shaft due to friction with the drive shaft. Secondly, a rapidly reduced voltage is applied to the piezoelectric vibrator. The position of the piezoelectric vibrator is then returned to the original position and, at the same time, the drive shaft rapidly returns to its own initial position. At this time, slippage is caused between the movable body and drive shaft, so that the movable body stays at the same position. By applying the sawtooth wave drive pulse including a gradually increased voltage and rapidly reduced voltage to the piezoelectric vibrator as described above, the movable body is moved from one point to another. When the above operation is repeated, the movable body can intermittently be moved relative to the stationary member. To move the movable body in the reverse direction, a horizontally inverted sawtooth wave drive pulse is applied to the piezoelectric vibrator.

An actuator that uses the above drive principle is disclosed in U.S. Pat. No. 5,225,941. In this patent, the impact drive actuator is applied to a camera lens drive mechanism. A movable body serving as a lens barrel is fitted to a drive shaft. Further, an elastic member having a bent portion is attached to the movable body at the fitting portion. In this case, the bent portion of the elastic member is brought into pressure contact with the drive shaft to generate an adequate frictional force.

Another example is disclosed in U.S. Pat. No. 5,589,723. In an actuator disclosed in this patent, a friction adjuster including a piezoelectric vibrator is used for a portion that generates friction. By synchronizing a voltage applied to the piezoelectric generator of the friction adjuster and a voltage applied to a piezoelectric vibrator for displacing a drive shaft with each other, an appropriate frictional force for a movable body to be moved is obtained.

BRIEF SUMMARY OF THE INVENTION

According to an aspect of the present invention, there is provided an impact drive actuator comprising:

a vibrating base plate configured to be slightly displaced in a reciprocating manner by a vibrator in a first direction and a second direction opposite to the first direction;

a first slider disposed on the vibrating base plate;

a first electrode formed on the vibrating base plate;

a second electrode so formed on the first slider as to face the first electrode through an insulation film; and a potential difference generator configured to generate a potential difference between the first and second electrodes to allow a first electrostatic attractive force to act between the vibrating base plate and first slider, wherein when the vibrator reciprocates the vibrating base plate, the time needed to displace the vibrating base plate in the first direction and time needed to displace the same in the second direction differ from each other, and the first slider is displaced relative to the vibrating base plate in the direction where the time needed for displacement is larger.

According to another aspect of the present invention, there is provided an impact drive actuator comprising:

a vibrating base plate for being slightly displaced in a reciprocating manner by a displacement generating means in a first direction and a second direction opposite to the first direction;

a first slider disposed on the vibrating base plate;

a first electrode formed on the vibrating base plate;

a second electrode so formed on the first slider as to face the first electrode through an insulation film; and first electrostatic attractive force generating means for allowing a first electrostatic attractive force to act between the vibrating base plate and first slider using a potential difference between the first and second electrodes, wherein when the displacement generating means reciprocates the vibrating base plate, the time needed to displace the vibrating base plate in the first direction and time needed to displace the same in the second direction differ from each other, and the first slider is displaced relative to the vibrating base plate in the direction where the time needed for displacement is larger.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

A preferred embodiment of the present invention will be described below with reference to the accompanying drawings.

First Embodiment

Figure 1A:
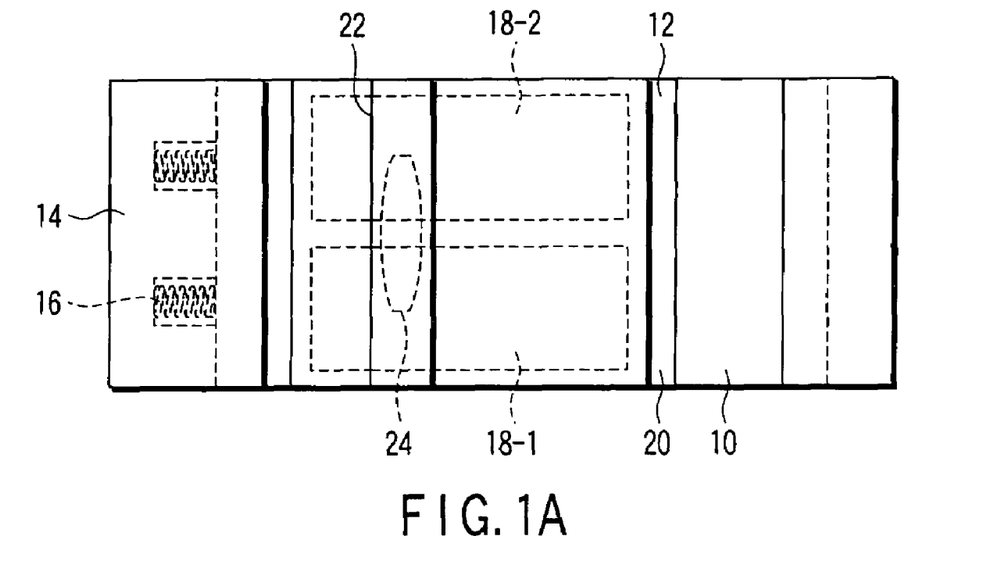
FIG. 1A is a top view of an impact drive actuator according to a first embodiment of the present invention.
Figure 1B:
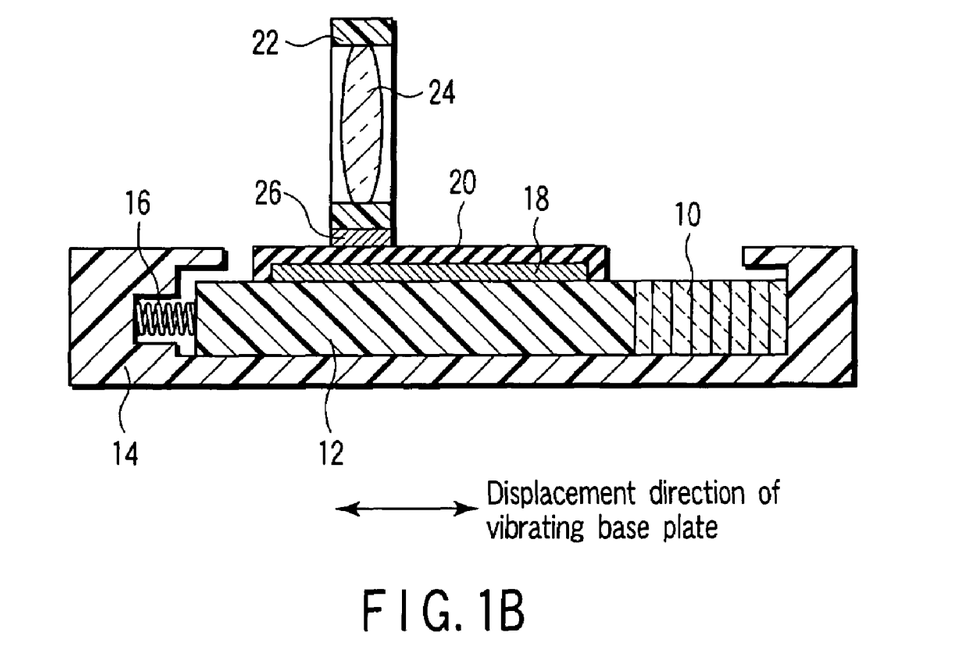
FIG. 1B is a side cross-sectional view of the impact drive actuator.

As shown in FIGS. 1A and 1B, in an impact drive actuator according to a first embodiment, a piezoelectric vibrator 10 and a vibrating base plate 12 are disposed on a fixed base plate 14. One end of the piezoelectric vibrator 10 contacts the base plate 14 and the other end thereof contacts one end of the vibrating base plate 12. The vibrating base plate 12 is biased by a biasing spring 16 provided at the other end of the vibrating base plate 12 toward the piezoelectric vibrator 10 side. Therefore, when the piezoelectric vibrator 10 is slightly displaced in a reciprocating manner in the direction denoted by the arrow of FIG. 1B, the vibrating base plate 12 is correspondingly slightly displaced in a reciprocating manner. It is assumed that the resonance frequency of the biasing spring 16 is higher than the vibration frequency of the piezoelectric vibrator 10 obtained at the drive time.

A vibrating base plate electrode 18 is formed on the vibrating base plate 12, and an insulation film 20 is formed on the vibrating base plate electrode 18. As shown in FIG. 1A, the vibrating base plate electrode 18 is divided, in the direction perpendicular to the vibration direction of the piezoelectric vibrator 10, into two strip-like electrodes 18-1 and 18-2.

A slider 22 is disposed on the vibrating base plate 12, and a lens 24 is incorporated in the slider 22. A slider electrode 26 is formed on one surface of the slider 22 that faces the vibrating base plate 12. The slider electrode 26 faces the vibrating base plate electrode 18 through the insulation film 20.

Although not shown, the wiring of the piezoelectric vibrator 10 is connected to a pulse generation circuit, and the vibrating base plate electrodes 18-1 and 18-2 are connected to a voltage generation circuit.

A guide mechanism or the like may be provided for preventing the slider 22 from being moved in the directions other than the vibration direction of the piezoelectric vibrator 10.

Figure 2:
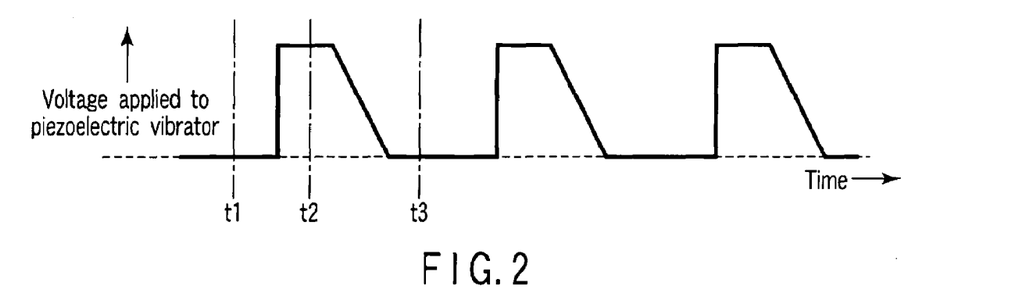
FIG. 2 is a view showing a relationship between a voltage applied to a piezoelectric vibrator and time when a slider is displaced in the contraction direction of the piezoelectric vibrator.

As shown in FIG. 2, a voltage applied from a not shown pulse generation circuit to the piezoelectric vibrator 10 is rapidly increased between times t1 and t2. As compared with the rapidly increased voltage between times t1 and t2, the voltage is reduced in a more gradual manner between times t2 and t3 to be equal to a voltage value at time t1. Such a voltage pulse is repeatedly applied from a not shown pulse generation circuit to the piezoelectric vibrator 10.

A predetermined voltage is applied between the vibrating base plate electrodes 18-1 and 18-2 by a not shown voltage generation circuit. Then, the potential of the slider electrode 26 facing the vibrating base plate electrodes 18-1 and 18-2 through the insulation film 20 becomes an intermediate potential between the vibrating base plate electrodes 18-1 and 18-2. Accordingly, an electrostatic force acts between the vibrating base plate electrodes 18-1, 18-2 and slider electrode 26 to allow the slider 22 to be electrostatically attracted to the vibrating base plate 12. This electrostatic attractive force can be controlled by a voltage applied between the vibrating base plate electrodes 18-1 and 18-2.

Figure 3:
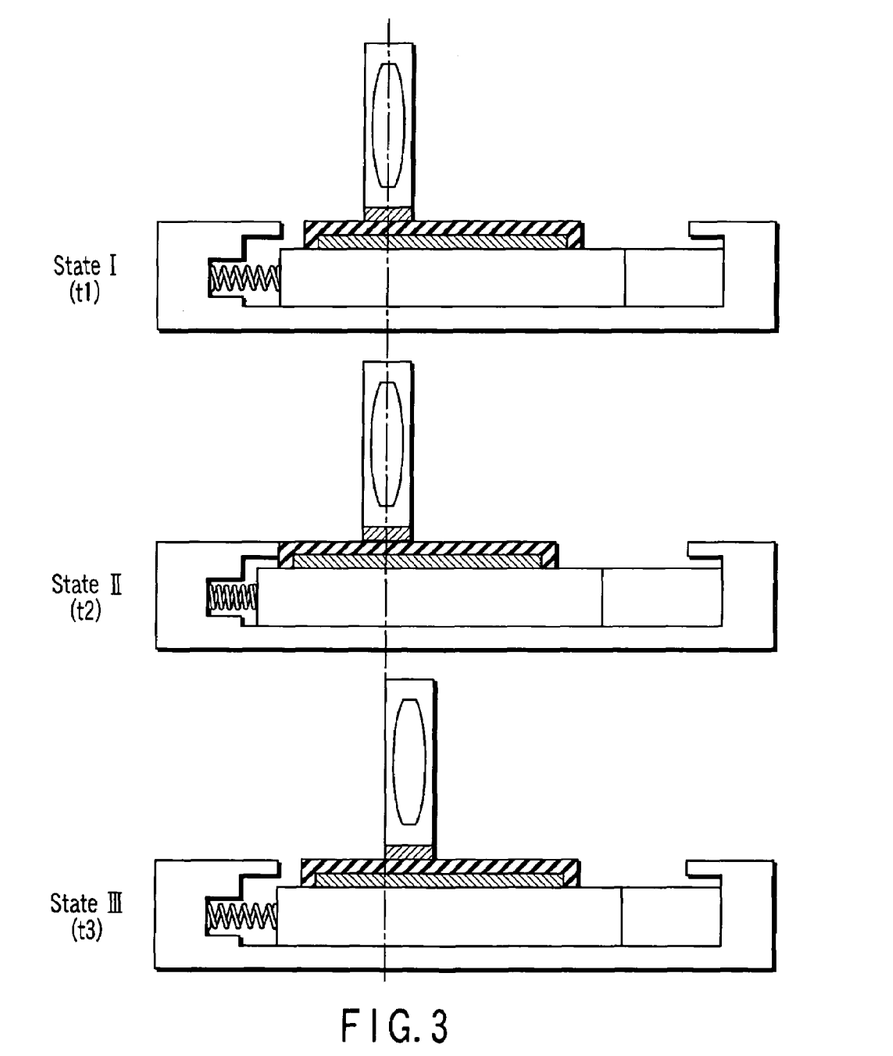
FIG. 3 is a view showing states of the impact drive actuator at time t1, time t2, and time t3 in FIG. 2.

As shown in FIG. 3, in a state I at time t1, a low voltage is applied to the piezoelectric vibrator 10 as described above. Therefore, the piezoelectric vibrator 10 is in a contracted state.

In a state II at time t2, i.e., after a rapidly increased voltage has been applied to the piezoelectric vibrator 10, the piezoelectric vibrator 10 is in an expanded state. At this time, the vibrating base plate 12 is rapidly displaced along with the expansion of the piezoelectric vibrator 10. Slippage is accordingly caused between the vibrating base plate 12 and slider 22, so that the slider 22 is displaced in the opposite direction to the expansion direction of the piezoelectric vibrator 10 relative to the vibrating base plate 12.

In a state III at time t3, i.e., after a voltage applied to the piezoelectric vibrator 10 has gradually been reduced to be equal to a voltage at time t1, the piezoelectric vibrator 10 is in a contracted state. At this time, the vibrating base plate 12 is gradually displaced along with the contraction of the piezoelectric vibrator 10. Accordingly, the slider 22 is kept electrostatically attracted to the vibrating base plate 12. Therefore, the slider 22 is not displaced relative to the vibrating base plate 12 from time t2 to time t3.

By repeatedly switching between the state I, state II, and state III as described above, the slider 22 is stepwise driven in the opposite direction of the expansion direction of the piezoelectric vibrator 10 relative to the vibrating base plate 12, i.e., the slider 22 is stepwise driven in the contraction direction of the piezoelectric vibrator 10 relative to the base plate 14.

A drive method for displacing the slider 22 in the contraction direction of the piezoelectric vibrator 10 has been described. Hereinafter, a method for displacing the slider 22 in the expansion direction of the piezoelectric vibrator 10 will be described.

Figure 4:
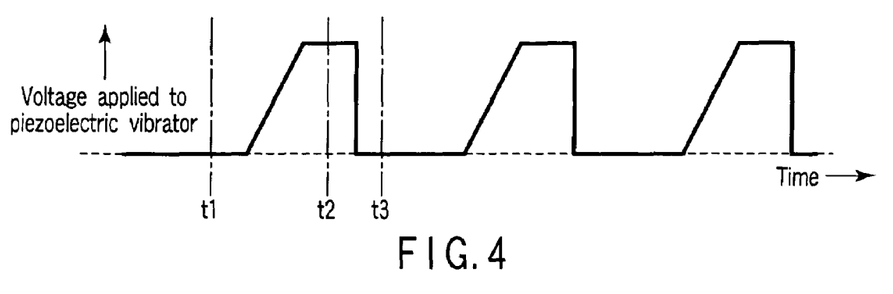
FIG. 4 is a view showing a relationship between a voltage applied to the piezoelectric vibrator and time when the slider is displaced in the expansion direction of the piezoelectric vibrator.

In this case, a voltage pulse as shown in FIG. 4 is applied from a not shown pulse generation circuit to the piezoelectric vibrator 10. That is, a voltage applied to the piezoelectric vibrator 10 is gradually increased between times t1 and t2 and then reduced between times t2 and t3 in a more rapid manner as compared with the gradually increased voltage between times t1 and t2 to be equal to a voltage at time t1. Further, a predetermined voltage is applied between the vibrating base plate electrodes 18-1 and 18-2 by a not shown voltage generation circuit.

Figure 5:
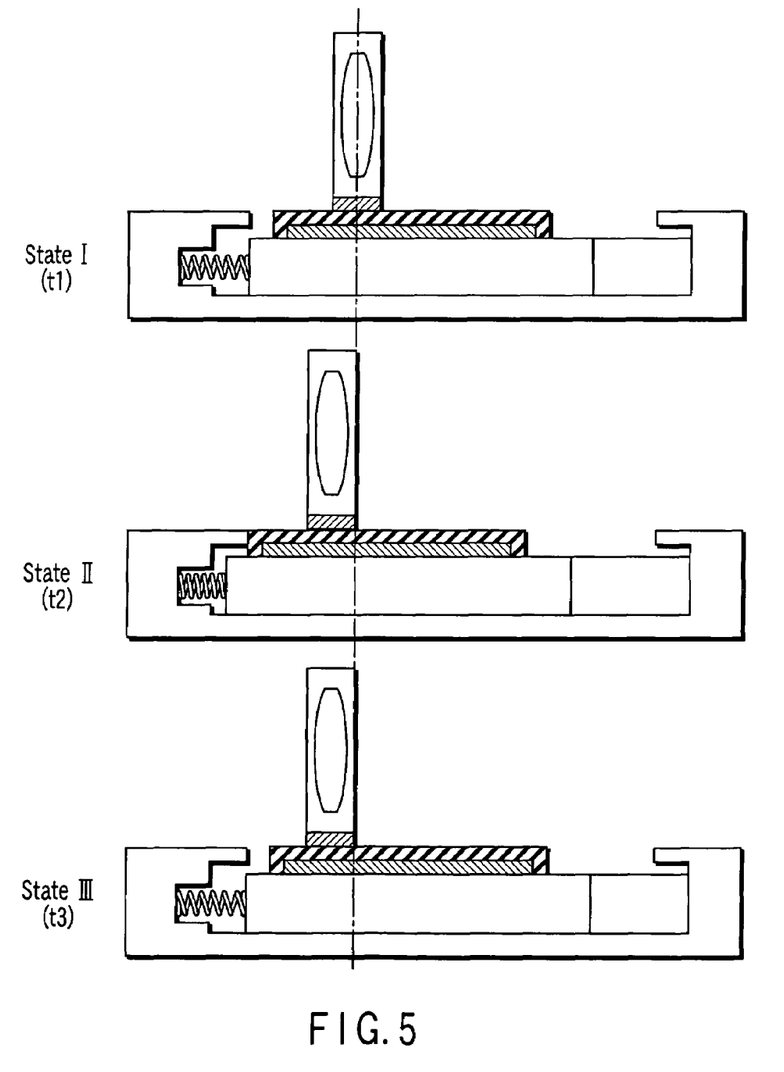
FIG. 5 is a view showing states of the impact drive actuator at time t1, time t2, and time t3 in FIG. 4.

As shown in FIG. 5, in a state I at time t1, a low voltage is applied to the piezoelectric vibrator 10, so that the piezoelectric vibrator 10 is in a contracted state.

In a state II at time t2, i.e., after a gradually increased voltage has been applied to the piezoelectric vibrator 10, the piezoelectric vibrator 10 is in an expanded state. At this time, the vibrating base plate 12 is gradually displaced along with the expansion of the piezoelectric vibrator 10. Accordingly, the slider 22 is kept electrostatically attracted to the vibrating base plate 12. Therefore, the slider 22 is not displaced relative to the vibrating base plate 12 from time t1 to time t2.

In a state III at time t3, i.e., after a voltage applied to the piezoelectric vibrator 10 has rapidly been reduced to be equal to a voltage value at time t1, the piezoelectric vibrator 10 is in a contracted state. At this time, the vibrating base plate 12 is rapidly displaced along with the contraction of the piezoelectric vibrator 10. Slippage is accordingly caused between the vibrating base plate 12 and slider 22, so that the slider 22 is displaced in the opposite direction to the contraction direction of the piezoelectric vibrator 10 relative to the vibrating base plate 12.

By repeatedly switching between the state I, state II, and state III as described above, the slider 22 is stepwise driven in the opposite direction of the contraction direction of the piezoelectric vibrator 10 relative to the vibrating base plate 12, i.e., the slider 22 is stepwise driven in the expansion direction of the piezoelectric vibrator 10 relative to the base plate 14.

As described above, in the first embodiment, a voltage pulse applied from a not shown pulse generation circuit to the piezoelectric vibrator 10 is set to a waveform as shown in FIG. 2 or FIG. 4, thereby allowing the slider 22 to be stepwise driven in the contraction or expansion direction of the piezoelectric vibrator 10.

In the examples shown in FIGS. 3 and 5, the slider 22 is not displaced relative to the vibrating base plate 12 when the vibrating base plate 12 is gradually displaced. However, when the slippage amount, i.e., the relative displacement amount between the slider 22 and vibrating base plate 12 is smaller than that obtained in the case where the vibrating base plate 12 is rapidly displaced, it is possible to substantially stepwise drive the slider 22 relative to the base plate 14.

How much the slider 22 is displaced relative to the vibrating base plate 12 along with the displacement of the vibrating base plate 12, or how much the slider 22 is kept attracted to the vibrating base plate 12 depends not only on the displacement speed or displacement acceleration of the vibrating base plate 12, but also on the electrostatic attractive force between the slider 22 and vibrating base plate 12. The electrostatic attractive force can be controlled by a voltage applied between the vibrating base plate electrodes 18-1 and 18-2, as described above. Accordingly, it is only necessary to set the voltage applied between the vibrating base plate electrodes 18-1 and 18-2 such that the slider 22 is comparatively slightly displaced relative to the vibrating base plate 12 or the slider 22 is not displaced relative to the vibrating base plate 12 when a gradually changed voltage is applied to the piezoelectric vibrator 10. As a matter of course, the voltage applied between the vibrating base plate electrodes 18-1 and 18-2 is set such that the slider 22 is comparatively largely displaced relative to the vibrating base plate 12 when a rapidly changed voltage is applied to the piezoelectric vibrator 10.

As described above, in the impact drive actuator according to the first embodiment, a frictional force required for a drive mechanism can be obtained by the electrostatic attractive force between the vibrating base plate 12 and slider 22, eliminating the need to provide a mechanical pressing mechanism that controls a pressing force. Therefore, a size reduction can be realized.

In the case where such a mechanical pressing mechanism is used, a frictional force may decrease with time due to operational wear or the like, preventing drive operation from being normally performed in some cases. In the first embodiment, a voltage applied between the vibrating base plate electrodes 18-1 and 18-2 is used to control the frictional force between the vibrating base plate 12 and the slider 22. Therefore, by setting an application voltage corresponding to a change in a contact state between the vibrating base plate 12 and the slider 22, it is possible to allow the actuator to stably operate over long periods.

Second Embodiment

As shown in FIGS. 6A to 6D, in an impact drive actuator according to a second embodiment of the present invention, a piezoelectric vibrator 28 and a vibrating base plate 30 are disposed on a fixed base plate 32. One end of the piezoelectric vibrator 28 contacts the base plate 32 and the other end thereof contacts one end of the vibrating base plate 30. The vibrating base plate 30 is biased by a biasing spring 34 provided at the other end of the vibrating base plate 30 toward the piezoelectric vibrator 28 side. Therefore, when the piezoelectric vibrator 28 is slightly displaced in a reciprocating manner in the direction denoted by the arrow of FIG. 6B, the vibrating base plate 30 is correspondingly slightly displaced in a reciprocating manner.

Figure 6A:
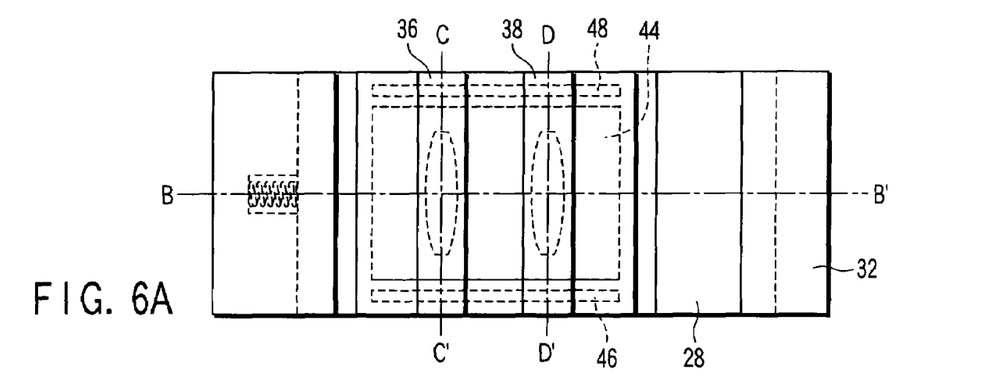
FIG. 6A is a top view of an impact drive actuator according to a second embodiment of the present invention.
Figure 6B:
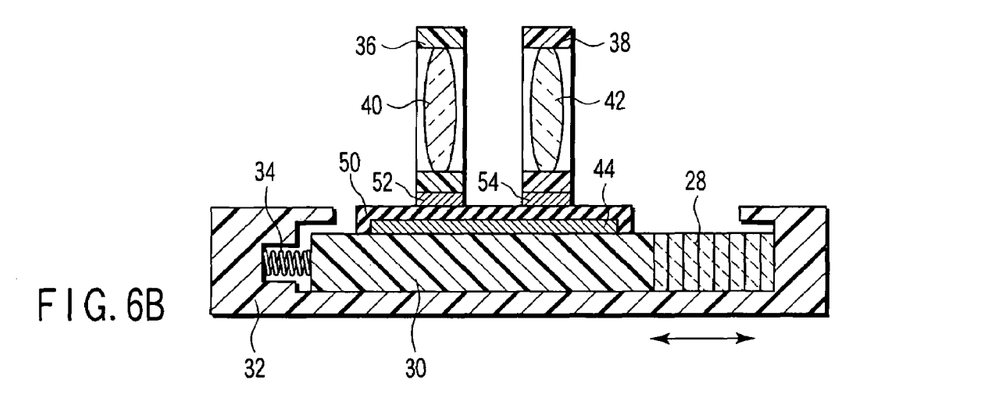
FIG. 6B is a cross-sectional view of the impact drive actuator taken along B-B' line of FIG. 6A.

A first slider 36 and a second slider 38 are disposed on the vibrating base plate 30. A first lens 40 and a second lens 42 are incorporated in the first and second sliders 36 and 38, respectively.

Figure 6C:
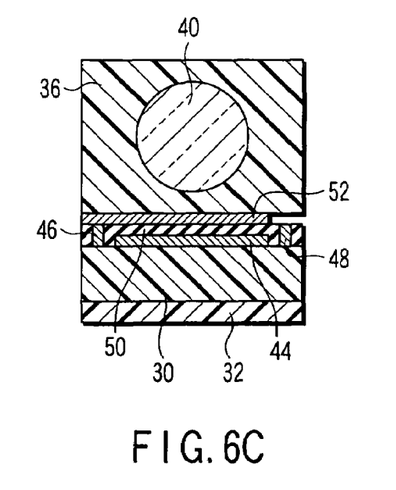
FIG. 6C is a cross-sectional view of the impact drive actuator taken along C-C' line of FIG. 6A.
Figure 6D:
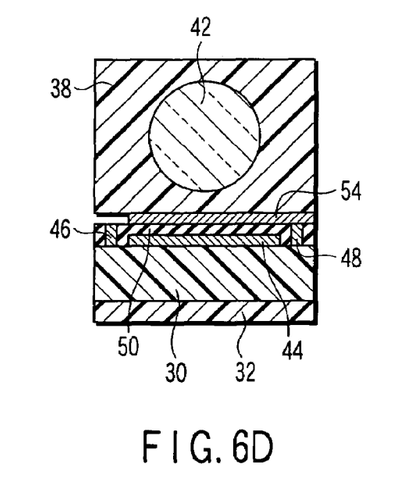
FIG. 6D is a cross-sectional view of the impact drive actuator taken along D-D' line of FIG. 6A.

As shown in FIG. 6A, a vibrating base plate electrode 44 for attraction is formed on the vibrating base plate 30. A first vibrating base plate electrode 46 for power supply and a second vibrating base plate electrode 48 for power supply are formed on both sides of the vibrating base plate electrode 44 for attraction. As shown in FIGS. 6C and 6D, an insulation film 50 is formed on the vibrating base plate electrode 44 for attraction. The surfaces of the first and second vibrating base plate electrodes 46 and 48 for power supply are exposed at the same level as that of the insulation film 50. However, the level of the surfaces of the first and second vibrating base plate electrodes 46 and 48 for power supply may be slightly higher than that of the insulation film 50.

A first slider electrode 52 is formed on a surface of the first slider 36 that faces the vibrating base plate 30. A second slider electrode 54 is formed on a surface of the second slider 38 that faces the vibrating base plate 30. As shown in FIGS. 6C and 6D, the first slider electrode 52 exists in an area that faces the first vibrating base plate electrode 46 for power supply and vibrating base plate electrode 44 for attraction. The second slider electrode 54 exists in an area that faces the second vibrating base plate electrode 48 for power supply and vibrating base plate electrode 44 for attraction.

The first slider electrode 52 is brought into conduction with the first vibrating base plate electrode 46 for power supply and faces the vibrating base plate electrode 44 for attraction through the insulation film 50. The second slider electrode 54 is brought into conduction with the second vibrating base plate electrode 48 for power supply and faces the vibrating base plate electrode 44 for attraction through the insulation film 50.

Although not shown, the wiring of the piezoelectric vibrator 28 is connected to a pulse generation circuit and the first vibrating base plate electrode 46 for power supply and second vibrating base plate electrode 48 for power supply are connected a voltage generation circuit that can independently be controlled. The vibrating base plate electrode 44 for attraction is grounded.

When, for example, a first voltage from a not shown voltage generation circuit is applied to the first vibrating base plate electrode 46 for power supply, the first slider electrode 52 brought into conduction with the first vibrating base plate electrode 46 for power supply exhibits the same potential as that of the first vibrating base plate electrode 46 for power supply. Therefore, the potential difference between the grounded vibrating base plate electrode 44 for attraction and first slider electrode 52 becomes equal to the first voltage, and an electrostatic attractive force corresponding to the voltage acts between the vibrating base plate 30 and first slider 36.

Similarly, when a second voltage from a not shown voltage generation circuit is applied to the second vibrating base plate electrode 48 for power supply, the second slider electrode 54 brought into conduction with the second vibrating base plate electrode 48 for power supply exhibits the same potential as that of the second vibrating base plate electrode 48 for power supply. Therefore, the potential difference between the grounded vibrating base plate electrode 44 for attraction and second slider electrode 54 becomes equal to the second voltage, and an electrostatic attractive force corresponding to the voltage acts between the vibrating base plate 30 and second slider 38.

As described above, use of the voltages applied from a not shown voltage generation circuit to the first vibrating base plate electrode 46 for power supply and second vibrating base plate electrode 48 for power supply allows electrostatic attractive forces between the first slider 36 and vibrating base plate 30 and between the second slider 38 and vibrating base plate 30 to be controlled independently of each other.

Figure 7A:
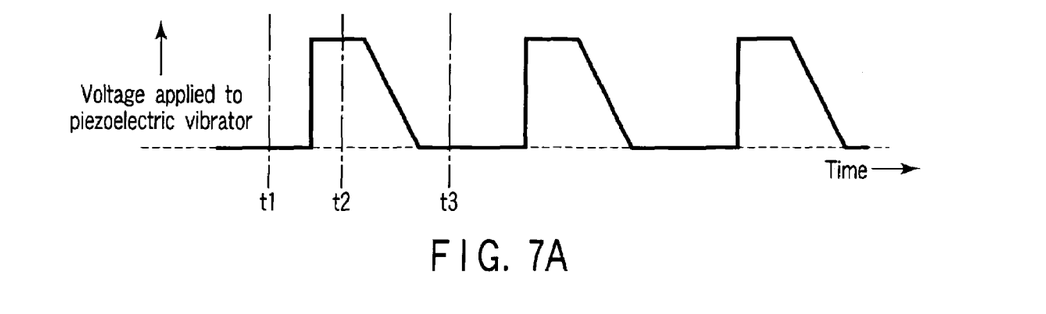
FIG. 7A is a view showing a relationship between a voltage applied to the piezoelectric vibrator and time when a first slider is displaced in the contraction direction of the piezoelectric vibrator and a second slider is kept in substantially a stationary state.

In the impact drive actuator according to the second embodiment, a voltage pulse as shown in FIG. 7A is applied from a not shown pulse generation circuit to the piezoelectric vibrator 28. As in the case of FIG. 2, the voltage applied to the piezoelectric vibrator 28 is rapidly increased between times t1 and t2, and the voltage is reduced between times t2 and t3 in a more gradual manner as compared with the rapidly increased voltage between times t1 and t2 to be equal to a voltage at time t1. Such a voltage pulse is repeatedly applied to the piezoelectric vibrator 28.

Figure 7B:
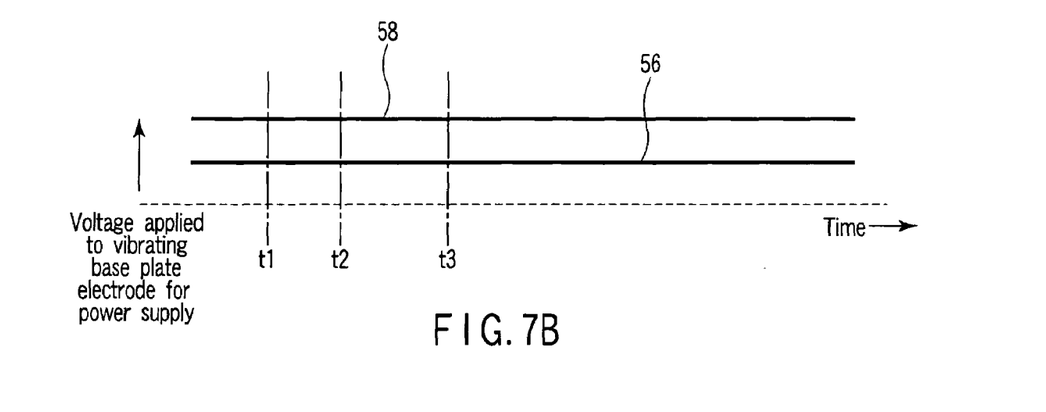
FIG. 7B is a view showing voltages respectively applied to a first vibrating base plate electrode for power supply and second vibrating base plate electrode for power supply when a first slider is displaced in the contraction direction of the piezoelectric vibrator and a second slider is kept in substantially a stationary state.

Further, a voltage as shown in FIG. 7B is applied from a not shown voltage generation circuit to the first vibrating base plate electrode 46 for power supply and the second vibrating base plate electrode 48 for power supply. As shown in FIG. 7B, a voltage 58 applied to the second vibrating base plate electrode 48 for power supply is greater than a voltage 56 applied to the first vibrating base plate electrode 46 for power supply. Accordingly, the electrostatic attractive force between the second slider 38 and vibrating base plate 30 is greater then the electrostatic attractive force between the first slider 36 and vibrating base plate 30.

Figure 8:
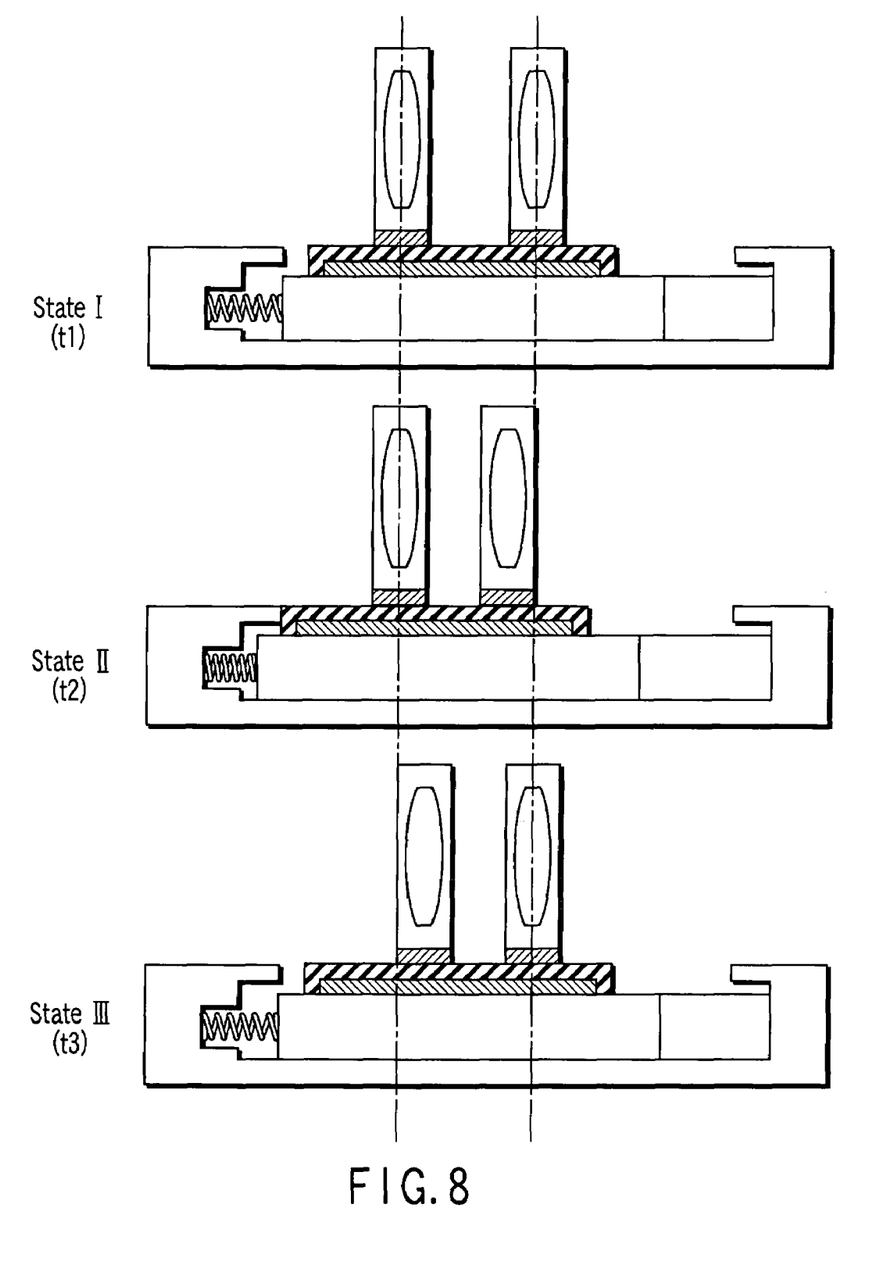
FIG. 8 is a view showing displacement states of the first and second sliders at time t1, time t2, and time t3 in FIGS. 7A and 7B.

As shown in FIG. 8, in a state I at time t1, a low voltage is applied to the piezoelectric vibrator 28. Therefore, the piezoelectric vibrator 28 is in a contracted state.

In a state II at time t2, i.e., after a rapidly increased voltage has been applied to the piezoelectric vibrator 28, the piezoelectric vibrator 28 is in an expanded state. At this time, the piezoelectric vibrator 28 is rapidly expanded, so that slippage is caused between the vibrating base plate 30 and first slider 36. Accordingly, the first slider 36 is displaced in the opposite direction to the expansion direction of the piezoelectric vibrator 28 relative to the vibrating base plate 30. On the other hand, the second slider 38 is attracted to the vibrating base plate 30 by an electrostatic attractive force greater than that applied to the first slider 36. Accordingly, the second slider 38 is kept attracted to the vibrating base plate 30 even when the vibrating base plate 30 is rapidly displaced, with the result that the second slider 38 is not displaced relative to the vibrating base plate 30. In this case, however, the second slider 38 is displaced relative to the base plate 32.

In a state III at time t3, i.e., after a voltage applied to the piezoelectric vibrator 28 has gradually been reduced to be equal to a voltage at time t1, the piezoelectric vibrator 28 is in a contracted state. At this time, the vibrating base plate 30 is gradually displaced along with the contraction of the piezoelectric vibrator 28. Accordingly, the first and second sliders 36 and 38 are kept electrostatically attracted to the vibrating base plate 30. Therefore, both the first and second sliders 36 and 38 are not displaced relative to the vibrating base plate 30 from times t2 to t3.

By repeatedly switching between the state I, state II, and state III as described above, the first slider 36 is stepwise driven in the opposite direction of the expansion direction of the piezoelectric vibrator 28 relative to the vibrating base plate 30, i.e., the first slider 36 is stepwise driven in the contraction direction of the piezoelectric vibrator 28 relative to the base plate 32. On the other hand, the second slider 38 is kept in a stationary state relative to the vibrating base plate 30, i.e., the second slider 38 is kept in substantially a stationary state relative to the base plate 32.

A method of displacing the first slider 36 in the contraction direction of the piezoelectric vibrator 28 and keeping the second slider 38 in a stationary state has been described.

When a voltage of the same pulse as that of FIG. 7A is applied to the piezoelectric vibrator 28, and voltages 56 and 58 of reversed level to that of FIG. 7B is applied to the first vibrating base plate electrode 46 for power supply and the second vibrating base plate electrode 48 for power supply, the electrostatic attractive force between the first slider 36 and vibrating base plate 30 becomes greater and the electrostatic attractive force between the second slider 38 and vibrating base plate 30 becomes smaller. In this case, it is possible to keep the first slider 36 in substantially a stationary state and to displace the second slider 38 in the contraction direction of the piezoelectric vibrator 28.

Figure 9A:
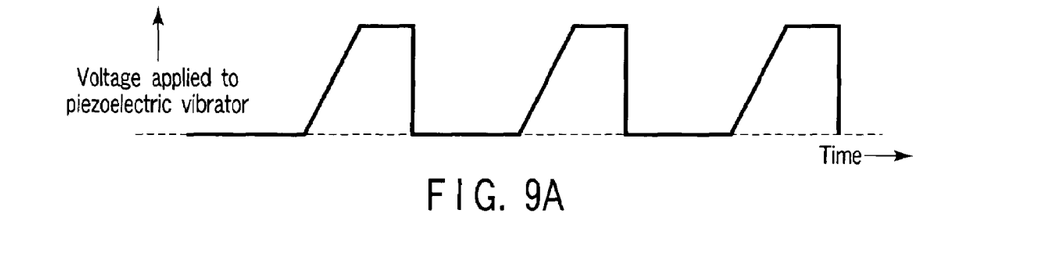
FIG. 9A is a view showing a relationship between a voltage applied to the piezoelectric vibrator and time when the first slider is displaced in the expansion direction of the piezoelectric vibrator and the second slider is kept in substantially a stationary state.
Figure 9B:
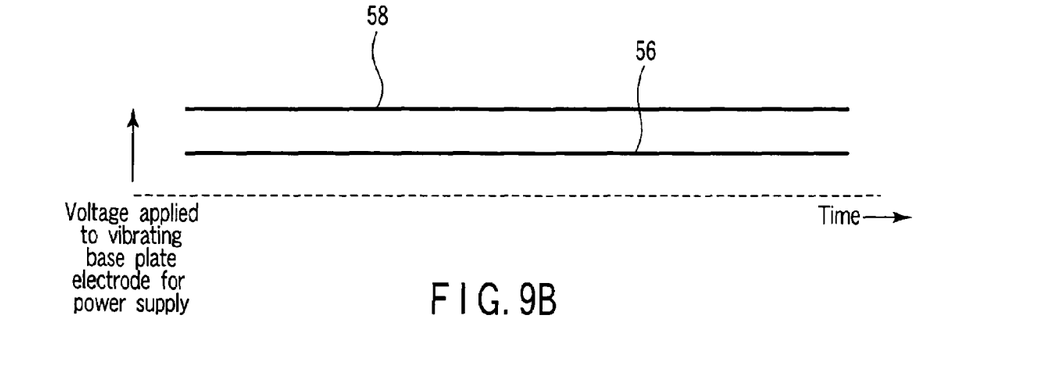
FIG. 9B is a view showing voltages applied to the first vibrating base plate electrode for power supply and second vibrating base plate electrode for power supply when the first slider is displaced in the expansion direction of the piezoelectric vibrator and the second slider is kept in substantially a stationary state.

When voltages as shown in FIGS. 9A and 9B are applied respectively to the piezoelectric vibrator 28 and first and second vibrating base plate electrodes 46 and 48 for power supply, the vibrating base plate 30 is gradually displaced along with the expansion of piezoelectric vibrator 28; on the other hand, the vibrating base plate 30 is rapidly displaced along with the contraction of the piezoelectric vibrator 28. Since the electrostatic attractive force applied to the first slider 36 is small and the electrostatic attractive force applied to the second slider 38 is great, it is possible to stepwise drive the first slider 36 relative to the base plate 32 in the expansion direction of the piezoelectric vibrator 28 and to keep the second slider 38 in substantially a stationary state.

Figure 10A:
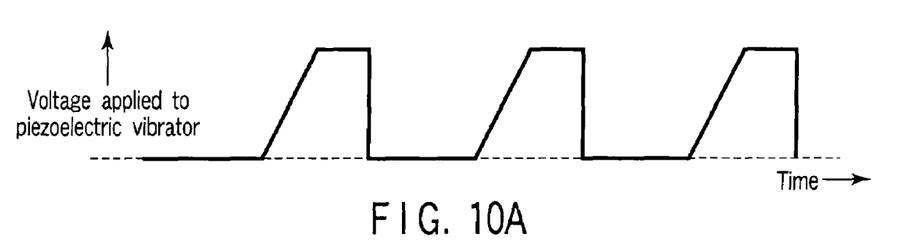
FIG. 10A is a view showing a relationship between a voltage applied to the piezoelectric vibrator and time when the first slider is kept in substantially a stationary state and the second slider is displaced in the expansion direction of the piezoelectric vibrator.
Figure 10B:
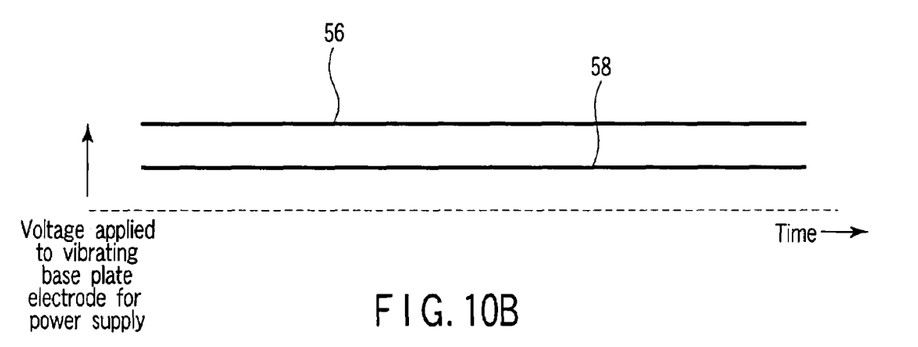
FIG. 10B is a view showing voltages applied to the first vibrating base plate electrode for power supply and second vibrating base plate electrode for power supply when the first slider is kept in substantially a stationary state and the second slider is displaced in the expansion direction of the piezoelectric vibrator.

When voltages as shown in FIGS. 10A and 10B are applied respectively to the piezoelectric vibrator 28 and first and second vibrating base plate electrodes 46 and 48 for power supply, the vibrating base plate 30 is gradually displaced along with the expansion of piezoelectric vibrator 28; on the other hand, the vibrating base plate 30 is rapidly displaced along with the contraction of the piezoelectric vibrator 28. Since the electrostatic attractive force applied to the first slider 36 is great and the electrostatic attractive force applied to the second slider 38 is small, it is possible to keep the first slider 36 in substantially a stationary state and to stepwise drive the second slider 38 in the expansion direction of the piezoelectric vibrator 28.

As described above, according to the second embodiment, by controlling a voltage pulse applied to the piezoelectric vibrator 28 and voltages applied to the first and second vibrating base plate electrodes 46 and 48 for power supply, it is possible to displace the first slider 36 and second slider 38 in an arbitrary direction relative to the base plate 32 in an independent manner.

In the examples shown in FIGS. 7A to 10B, one of the first and second sliders 36 and 38 to which a greater electrostatic attractive force is applied is not displaced relative to the vibrating base plate 30 even when the vibrating base plate 30 is rapidly displaced. However, even if the one slider is not in a completely stationary state, when the slippage amount of the one slider is smaller than that of the other slider to which a smaller electrostatic attractive force is applied, the speed of the displacement of the one slider relative to the base plate 32 is lower than that of the other slider. Therefore, it is possible to change the relative distance between the first slider 36 and second slider 38. Thus, by controlling a voltage pulse applied to the piezoelectric vibrator 28 and voltages applied to the first and second vibrating base plate electrodes 46 and 48 for power supply, it is possible to displace the first slider 36 and second slider 38 to an arbitrary position.

Further, in the examples shown in FIGS. 7A to 10B, the first slider 36 and second slider 38 are kept electrostatically attracted to the vibrating base plate 30 in the case where the vibrating base plate 30 is gradually displaced. However, even if slight slippage between one of the first and second sliders 36 and 38 and vibrating base plate 30 is caused, when the slippage amount is smaller than that obtained in the case where the vibrating base plate 30 is rapidly displaced, it is possible to stepwise drive the first slider 36 or second slider 38 in the direction corresponding to the voltage pulse applied to the piezoelectric vibrator 28.

In the second embodiment, a voltage having the same polarity as that of the grounded vibrating base plate electrode 44 for attraction is applied to the first vibrating base plate electrode 46 for power supply and the second vibrating base plate electrode 48 for power supply. In the case where a high voltage is applied in order to obtain a comparatively greater electrostatic attractive force, it is preferable that the polarity of the application voltage be appropriately reversed, or an alternating voltage be applied for obtaining a stable electrostatic attractive force while preventing a charge from being injected into the insulation film 50. In the case where an alternating voltage is applied, an electrostatic attractive force is controlled by the amplitude thereof.

In the impact drive actuator according to the second embodiment, the drive of two sliders 36 and 38 can independently be controlled by a single piezoelectric vibrator 28. Thus, it can be said that the impact drive actuator according to the second embodiment is suitably applied to a multi-element microactuator, in particular. When the number of sliders and that of vibrating base plate electrodes for power supply are increased, three or more sliders can be displaced by a single piezoelectric vibrator 28.

The potentials of the first slider electrode 52 and second slider electrode 54 are controlled through the first vibrating base plate electrode 46 for power supply and the second vibrating base plate electrode 48 for power supply. Alternatively, however, a lead wire directly connected to the first slider electrode 52 and second slider electrode 54 may be used to perform voltage control.

The piezoelectric vibrator 28 is used as a drive source for realizing slight reciprocating action in the first and second embodiments. Alternatively, however, a displacement generator such as a magnetostrictor, an electrostatic actuator, or an electromagnetic actuator may be used as the drive force as far as they can be displaced at different speeds depending on whether they are expanded or contracted.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An impact drive actuator comprising:
   a vibrating base plate configured to be slightly displaced in a reciprocating manner by a vibrator in a first direction and a second direction opposite to the first direction;
   a first slider and a second slider disposed on the vibrating base plate;
   a first electrode, a fourth electrode and a fifth electrode formed on the vibrating base plate;
   a second electrode and a third electrode so formed on the first slider and the second slider as to face the first, fourth and fifth electrodes through an insulation film; and
   a potential difference generator configured to generate a potential difference between the first electrode and the fifth electrode to allow a first electrostatic attractive force to act between the vibrating base plate and first slider by applying a voltage between the first electrode and the fifth electrode, and configured to generate a potential difference between the fourth electrode and the fifth electrode to allow a second electrostatic attractive force to act between the vibrating base plate and the second slider, by applying a voltage between the fourth electrode and the fifth electrode, wherein
   when the vibrator reciprocates the vibrating base plate, the potential difference generator causes an electrostatic force to act between the first electrode, the fifth electrode and the second electrode, by which a frictional force acting between the first slider and the vibrating base plate is changed, and to act between the fourth electrode, the fifth electrode and the third electrode, by which a frictional force acting between the second slider and the vibrating base plate is changed, thereby adjusting a displacement amount of the first slider and a displacement amount of the second slider, and the time needed to displace the vibrating base plate in the first direction and time needed to displace the vibrating base plate in the second direction differ from each other, and
   the first slider and the second slider are displaced relative to the vibrating base plate in the direction where the time needed for displacement is larger.

* * * * *